United States Patent
Nagai et al.

(10) Patent No.: US 8,935,885 B2
(45) Date of Patent: Jan. 20, 2015

(54) COUPLED STRUCTURE AND WINDOW REGULATOR

(75) Inventors: Kosuke Nagai, Kanagawa (JP); Tomohiro Kamiura, Kanagawa (JP)

(73) Assignee: Shiroki Corporation, Fujisawa-Shi, Kanagawa (JP)

(*) Notice: Subject to any disclaimer, the term of this patent is extended or adjusted under 35 U.S.C. 154(b) by 0 days.

(21) Appl. No.: 13/640,217

(22) PCT Filed: Dec. 27, 2010

(86) PCT No.: PCT/JP2010/073510
§ 371 (c)(1),
(2), (4) Date: Oct. 9, 2012

(87) PCT Pub. No.: WO2011/129033
PCT Pub. Date: Oct. 20, 2011

(65) Prior Publication Data
US 2013/0025208 A1    Jan. 31, 2013

(30) Foreign Application Priority Data

Apr. 12, 2010   (JP) .................................. 2010-091336

(51) Int. Cl.
*E05F 11/44* (2006.01)
*B21D 39/03* (2006.01)
(Continued)

(52) U.S. Cl.
CPC ............ *E05F 11/445* (2013.01); *B21D 39/032* (2013.01); *F16B 5/0096* (2013.01);
(Continued)

(58) Field of Classification Search
USPC .............. 49/351, 350, 349, 348, 502; 74/434, 74/435
See application file for complete search history.

(56) References Cited

U.S. PATENT DOCUMENTS 3,897,652 A * 8/1975 Hess ................................ 49/351
4,321,771 A * 3/1982 Koike .............................. 49/360
(Continued)

FOREIGN PATENT DOCUMENTS

CN     1106192 A     8/1995
JP     50-159459     12/1975
(Continued)

OTHER PUBLICATIONS

International Search Report from the Japanese Patent Office for International Application No. PCT/JP2010/073510, mailing date Mar. 8, 2011.
(Continued)

*Primary Examiner* — Katherine Mitchell
*Assistant Examiner* — Catherine A Kelly
(74) *Attorney, Agent, or Firm* — McGinn IP Law Group, PLLC

(57) ABSTRACT

A coupled structure with high separation strength and a window regulator. A lift arm (5) is provided with a tapered through-hole (35) provided with a first inner wall portion (33) work-hardened due to plastic deformation and a swell portion (45) having an inner wall surface (41) continuing to an inner wall surface (31) of the tapered through-hole (35) and provided with a second inner wall portion (43) work-hardened due to plastic deformation. A driven gear (3) is provided with a protrusion (51) fit in from the tapered through-hole (35) to the swell portion (45), provided with an outer wall portion (53) work-hardened due to plastic deformation, and having an outer wall surface (55) in close contact with the inner wall surface (31) of the tapered through-hole (35) and at least a part of the inner wall surface (41) of the swell portion (45).

8 Claims, 5 Drawing Sheets

(51) Int. Cl.
 *F16B 5/00* (2006.01)
 *F16B 17/00* (2006.01)

(52) U.S. Cl.
 CPC ......... *F16B17/008* (2013.01); *E05Y 2201/628* (2013.01); *E05Y 2800/45* (2013.01); *E05Y 2900/55* (2013.01)
 USPC .............................................. 49/351; 49/349

(56) References Cited

U.S. PATENT DOCUMENTS

| | | | | |
|---|---|---|---|---|
| 4,414,779 | A | * | 11/1983 | Ishii ................................ 49/351 |
| 4,848,032 | A | * | 7/1989 | Ballor et al. .................... 49/350 |
| 6,205,640 | B1 | | 3/2001 | Dubugnon |
| 6,279,269 | B1 | * | 8/2001 | Isomura et al. ................. 49/351 |
| 6,912,811 | B2 | * | 7/2005 | Kawashima et al. ........... 49/351 |
| 7,543,348 | B2 | * | 6/2009 | Le ..................................... 15/65 |
| 8,418,405 | B2 | * | 4/2013 | Yoshida et al. ................. 49/351 |
| 2003/0140561 | A1 | * | 7/2003 | Kawashima et al. ........... 49/351 |
| 2004/0025441 | A1 | * | 2/2004 | Blume et al. .................... 49/506 |
| 2007/0204517 | A1 | * | 9/2007 | Willetts et al. ................. 49/351 |

FOREIGN PATENT DOCUMENTS

| | | | |
|---|---|---|---|
| JP | 3048281 | | 2/1998 |
| JP | 2002-242528 | | 8/2002 |
| JP | 2003-251433 | A | 9/2003 |
| JP | CN 101104186 | A | 1/2008 |
| JP | 2009-040399 | | 2/2009 |
| JP | 2009-142887 | * | 2/2009 |
| JP | 2009-142887 | | 7/2009 |

OTHER PUBLICATIONS

Chinese Office Action dated dated Feb. 13, 2014, with English translation.

* cited by examiner

COUPLED STRUCTURE AND WINDOW REGULATOR

TECHNICAL FIELD

The present invention relates to a coupled structure formed by coupling a lower member and an upper member and to a window regulator having the coupled structure.

BACKGROUND ART

A structure formed by coupling two plate materials by caulking will be described using FIG. 5. In the drawing, a plate-shaped lower member 101 is preliminarily provided with a through-hole 103. A stepped and bottomed hole 107 coaxial with the through-hole 103 in the lower member 101 is provided to an upper surface of a plate-shaped upper member 105 laminated on the lower member 101 by an upper punch. The stepped and bottomed hole 107 is formed of a small diameter portion 107a on a bottom side and a large diameter portion 107b on an opening side.

Because a diameter of the upper punch is larger than a diameter of the through-hole 103, a rim portion of the through-hole 103 in the lower member 101 undergoes deformation and a cone portion 109 becoming smaller in diameter toward a lower surface is formed along the rim portion of the through-hole 103 in the lower member 101. Further, because the cone portion 109 is formed, the through-whole 103 has become a tapered through-hole becoming larger in diameter toward the lower surface.

The upper member 105 is provided with a protrusion 111 that fits into the cone portion 109 and the through-hole 103 in the lower member 101 and is in press-contact with an inner wall surface 109a of the cone portion 109 and an inner wall surface 103a of the through-hole 103.

Further, a conical recess 113 is provided to a lower end face of the protrusion 111 of the upper member 105. By providing the conical recess 113, flesh of the protrusion 111 of the lower member 101 that has fit into the through-hole 103 is guided to the inner wall surface 103a of the through-hole 103 and an outer wall surface 111a of the protrusion 111 comes in close contact with the inner wall surface 103a of the through-hole 103 (see, for example, Patent Document 1).

CITED LIST

Patent Document

Patent Document 1: JP-A-2009-142887

SUMMARY OF THE INVENTION

Problem that the Invention is to Solve

According to the coupled structure of FIG. 5, separation of the lower member 101 and the upper member 105 is prevented by bringing the outer wall surface of the protrusion 111 in close contact with the inner wall surface 103a of the through-hole 103 that is a tapered through-hole becoming larger in diameter toward the lower surface. However, an area across which the outer wall surface of the protrusion 111 is in close contact with the inner wall surface of the through-hole 103 is small. Hence, there is a problem that separation strength between the lower member 101 and the upper member 105 is low.

The invention was devised in view of the problem above and has an object to provide a coupled structure with high separation strength and a window regulator.

Means for Solving the Problem

A first invention to solve the problem above is a coupled structure formed by coupling a lower member and an upper member, characterized in that the lower member is provided with a tapered through-hole made larger in diameter toward a lower surface and provided with a first inner wall portion work-hardened due to plastic deformation along an inner wall surface, and a swell portion provided along a rim of an opening on a lower surface side of the tapered through-hole, having an inner wall surface continuing to the inner wall surface of the tapered through-hole, and provided with a second inner wall portion work-hardened due to plastic deformation along the inner wall surface, and that the upper member is provided with a protrusion having an outer wall surface in close contact with at least a part of the inner wall surface of the swell portion and also with the inner wall surface of the tapered through-hole, fitting in from the tapered through-hole to the swell portion, and having an outer wall portion work-hardened due to plastic deformation along the outer wall surface.

A second invention is the coupled structure of the first invention above characterized in that the upper member is provided with a bottomed hole on an upper surface side and a back side of the protrusion, and that the bottomed hole has a sectional shape smaller than a sectional shape of the protrusion and a bottom surface reaching a height of the tapered through-hole of the lower member.

A third invention is the coupled structure of the first or second invention above, characterized in that the upper member is provided with a recess in a lower end face of the protrusion.

A fourth invention is the coupled structure of any one of the first through third inventions above characterized in that the lower member is provided with a line trace having a diameter larger than an opening of the tapered through-hole on the lower surface.

A fifth invention is a window regulator having a drive source provided with a pinion on an output shaft, a lift arm disposed in a rotatable manner at an intermediate portion and coupled to a driven gear that meshes with the pinion at one rotation end, and a lift arm bracket attached to a window pane and provided with a guide extending in a direction that crosses an opening and closing direction of the window pane so as to engage with the other rotation end of the lift arm by the guide, characterized in that a coupled structure of the lift arm and the driven gear is the coupled structure of any one of the first through fourth inventions above.

A sixth invention is a window regulator having a lift arm provided with a hole penetrating through an intermediate portion and disposed in a rotatable manner about the hole, a lift arm bracket attached to a window pane and provided with a guide extending in a direction that crosses an opening and closing direction of the window pane so as to engage with a rotation end of the lift arm by the guide, an equalizer arm formed of a first arm portion and a second arm portion with an intermediate portion pivotally attached to the intermediate portion of the lift am by coupling the first arm portion and the second arm portion via the hole of the lift arm so that the equalizer arm is allowed to rotate with respect to the lift arm and to cross the lift arm in an X shape, and an equalizer arm bracket provided with a guide parallel to the guide of the lift arm bracket so as to guide the other rotation end of the equalizer arm by the guide, characterized in that a coupled structure of the first arm portion and the second arm portion of the equalizer arm is the coupled structure of any one of the first through fourth inventions above.

A meaning of the phrase, "made larger in diameter", referred to herein is not limited to gradually increasing a diameter of a circular hole and also includes gradually increasing a length across a circular or non-circular hole.

Advantages of the Invention

According to the first through fourth inventions above, the outer wall surface of the protrusion is in close contact with at least a part of the inner wall surface of the swell portion and also with the inner wall surface of the tapered through-hole that is made larger in diameter toward the lower surface. Accordingly, an area across which the outer wall surface of the protrusion of the upper member and the inner wall surface of the hole are in close contact with each other becomes larger, and separation strength of the lower member and the upper member therefore becomes higher. Hence, even when the lower member and the upper member are subjected to a separation force, the lower member and the upper member do not separate from each other and the coupled structure does not break.

The lower member is provided with the first inner wall portion work-hardened due to plastic deformation along the inner wall surface of the tapered through-hole and the second inner wall portion work-hardened due to plastic deformation along the inner wall surface of the swell portion. Also, the protrusion of the upper member that fits to the tapered through-hole and the swell portion is provided with the outer wall portion work-hardened due to plastic deformation along the outer wall surface. That is to say, shearing strength of the tapered through-hole and the swell portion of the lower member and shearing strength of the protrusion of the upper member become higher. Hence, even when the lower member and the upper member are subjected to a large force that forces the lower member and the upper member to undergo relative movement in a radial direction of the tapered through-hole, a shear failure does not occur in any of the tapered through-hole and the swell portion of the lower member and the protrusion of the upper member. Hence, the coupled structure does not break.

According to the fifth invention above, the coupled structure of the lift arm and the driven gear is the coupled structure set forth in any one of the first invention through the fourth invention. Hence, separation strength of the lift arm and the driven gear becomes higher. Also, shearing strength of the lift arm and the driven gear becomes higher.

According to the sixth invention above, the coupled structure of the first arm portion and the second arm portion of the equalizer arm is the coupled structure set forth in any one of the first invention through the fourth invention. Hence, separation strength of the first arm portion and the second arm potion of the equalizer arm becomes higher. Also, shearing strength of the first arm portion and the second arm portion of the equalizer arm becomes higher.

MODE FOR CARRYING OUT THE INVENTION

Firstly, an X-arm window regulator using a coupled structure of the present embodiment will be described using FIG. 3 and FIG. 4.

Figure 3:
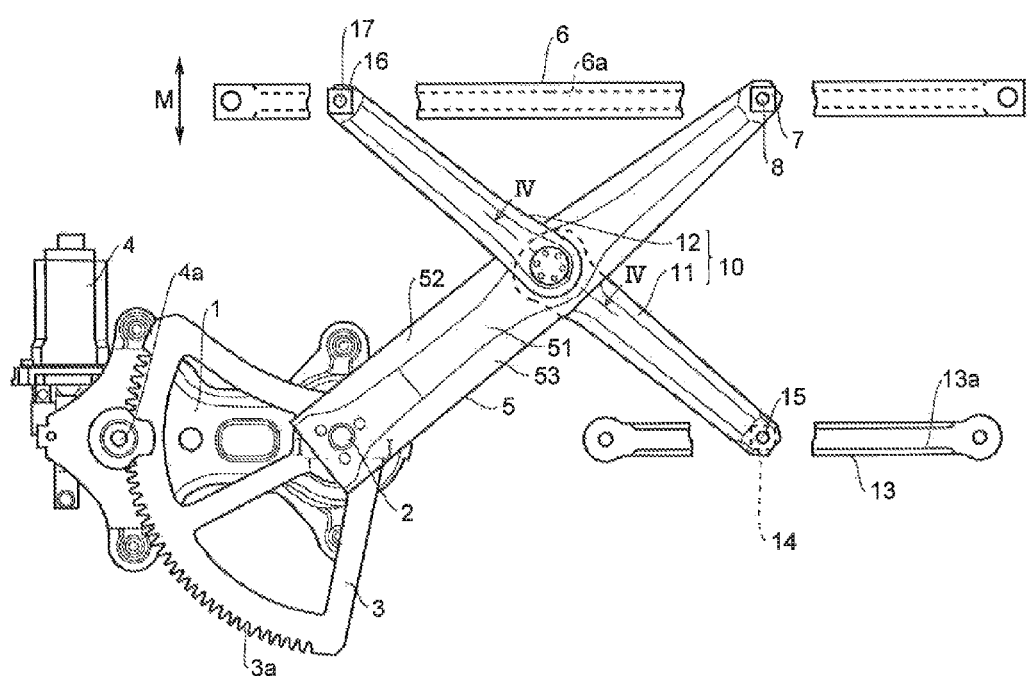
FIG. 3 is a view used to describe an X-arm window regulator using a coupled structure according to one embodiment.
Figure 4:
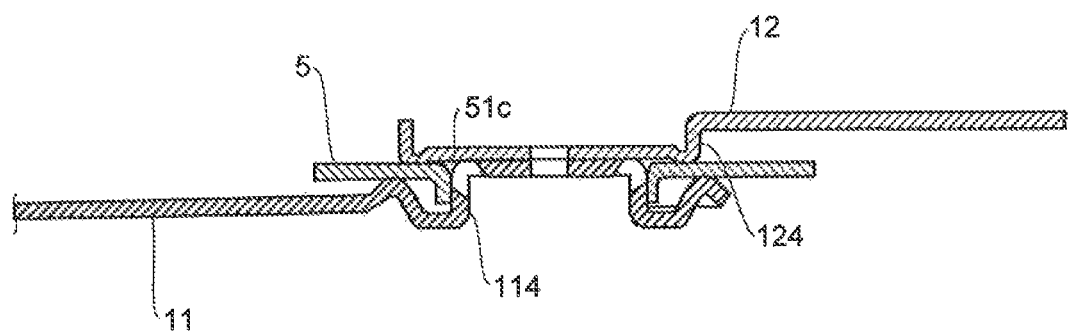
FIG. 4 is a cross section taken on the line IV-IV of FIG. 3.
Figure 5:
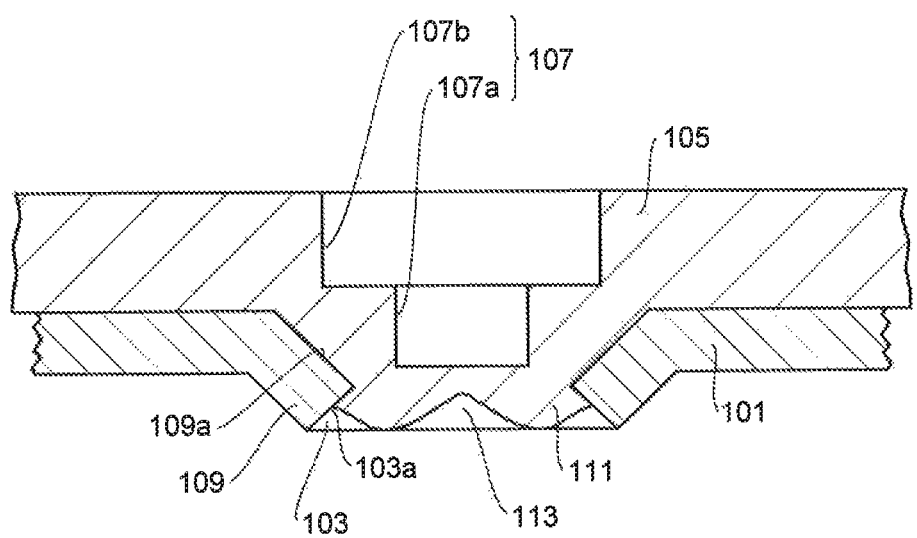
FIG. 5 is a view used to describe a structure formed by coupling two plate materials by caulking.

Referring to FIG. 3, a base plate 1 is to be attached to an unillustrated (inner) door panel. A driven gear 3 and a lift arm 5 are attached to the base plate 1 in a rotatable manner with a pin 2. The pin 2 is located at a center of an addendum circle of the driven gear 3

The window regulator shown in FIG. 3 is a power window regulator. Accordingly, a motor 4 together with a reduction gearbox is attached to the base plate 1. Although it is not shown in FIG. 3, a pinion is provided to a rotation shaft 4a that is a last output shaft of the motor 4 and a teeth portion 3a of the driven gear 3 meshes with the pinion. Hence, when the rotation shaft 4a is driven in a clockwise direction of the drawing by the motor 4, the driven gear 3 rotates in a counterclockwise direction. Conversely, when the rotation shaft 4a is driven in a counterclockwise direction, the driven gear 3 rotates in a clockwise direction.

The lift, arm 5 is coupled to the driven gear 3 by caulking.

A lift arm bracket 6 is to be attached to a lower portion of an unillustrated window pane. The lift arm bracket 6 has a cross section of substantially a C shape and is provided with a slit-like guide 6a extending in a direction that crosses an opening and closing direction M of the window pane. A slider 7 movable along the guide 6a fits to the lift arm bracket 6. The slider 7 is locked to the lift arm 5 with a pin 8 in a rotatable manner.

Regarding an equalizer arm 10, an intermediate portion is pivotally attached to an intermediate portion of the lift arm 5 so that the equalizer arm 10 is allowed to rotate with respect to the lift arm 5 and also to cross the lift arm 5 in an X shape. More specifically, the equalizer arm 10 is formed by integrally attaching separately molded first arm portion 11 and second arm portion 12. That is to say, as is shown in FIG. 4 that is a cross section taken on the line IV-IV of FIG. 3, a cylinder portion 114 of the first arm portion 11 fit in a hole 51c of the lift arm 5 in a rotatable manner and a cylinder portion 124 of the second arm portion 12 disposed oppositely to the first arm portion 11 with the lift arm 5 in between are coupled while respective end faces (bottom portions) are abutted on each other. Accordingly, the first arm portion 11 and the second arm portion 12 rotate integrally in front and back of the lift arm 5.

Referring to FIG. 3 again, an equalizer arm bracket 13 is to be attached to the unillustrated (inner) door panel and has a cross section of substantially a C shape. The equalizer arm bracket 13 is provided with a guide 13a parallel to the guide 6a of the lift arm bracket 6. A slider 14 movable along the guide 13a fits to the equalizer arm bracket 13. The slider 14 is locked to a base end portion (first arm portion 11) of the equalizer arm 10 with a pin 15 in a rotatable manner.

Meanwhile, a slider 16 is locked to a tip end portion (second arm portion 12) of the equalizer arm 10 with a pin 17 in a rotatable manner. This slider 16 fits to the lift arm bracket 6 in a movable manner along the guide 6a.

An operation of the X-arm window regulator configured as above will now be described.

FIG. 3 shows a state where the window pane is closed. Hence, the lift arm 5 has been rotated in a counterclockwise direction until the window pane abuts on a window frame. In order to lower the window pane from this state, the lift arm 5 is rotated in a clockwise direction by driving the rotation shaft 4a in a counterclockwise direction of FIG. 3 by the motor 4. When driven in this mariner, the equalizer arm 10 rotates in a counterclockwise direction in association with a rotation of the lift arm 5. Eventually, the sliders 7 and 16 move down while moving in a guide direction of the guide 6a and thereby force the lift arm bracket 6 to move down in the direction M. Accordingly, the window pane is lowered, too. When the window pane is raised later, the rotation shaft 4a is driven in a clockwise direction by the motor 4.

Figure 1:
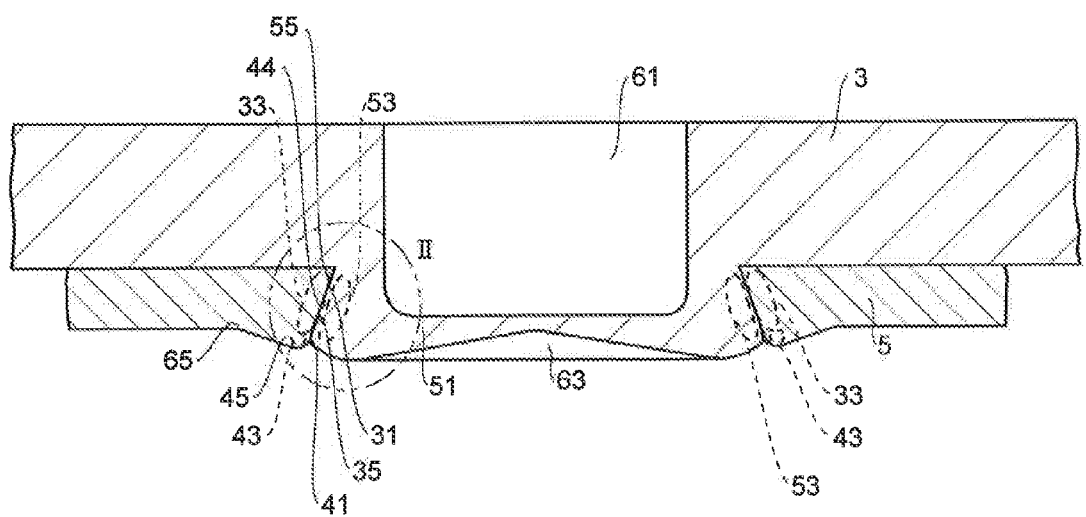
FIG. 1 is a cross section of a portion of the invention according to one embodiment inversely showing a top-bottom relation of a lift arm and a driven gear in a cross section taken on the line I-I of FIG. 3.
Figure 2:
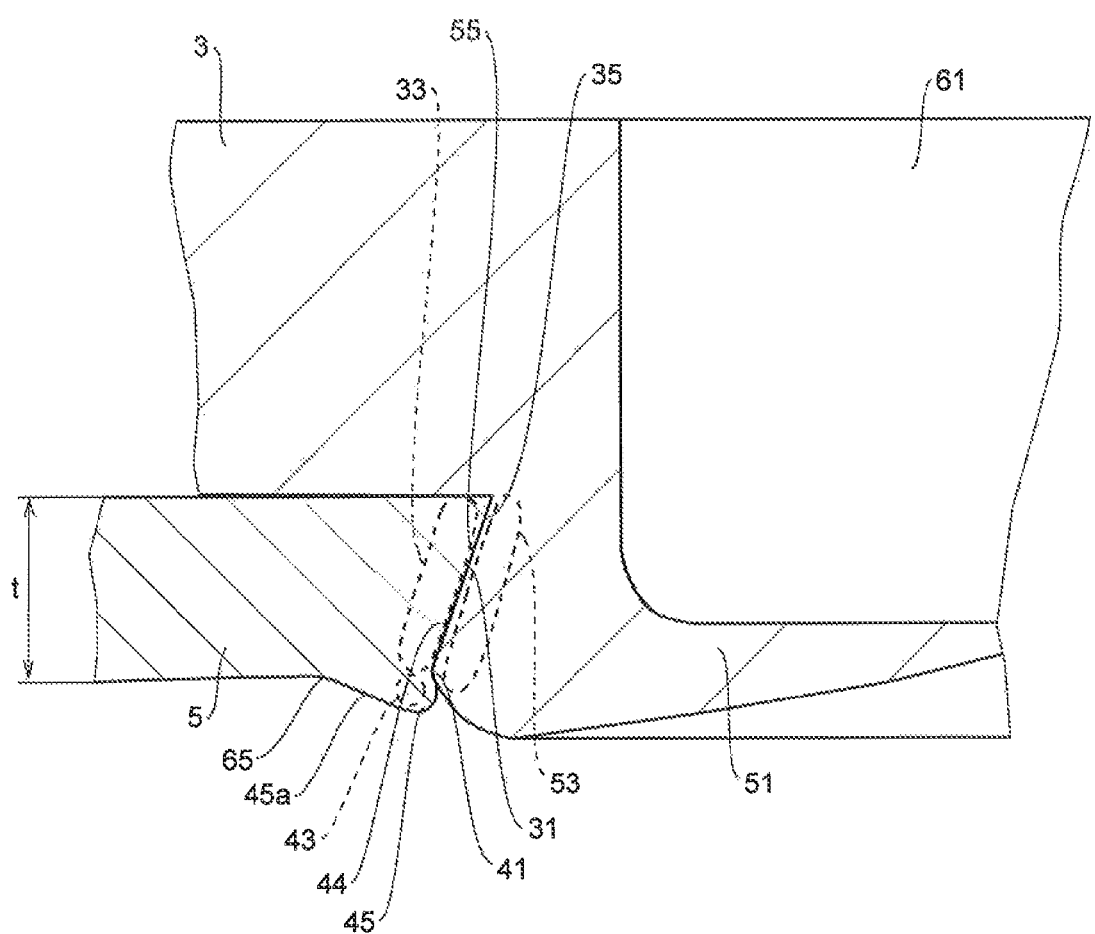
FIG. 2 is an enlarged view of a portion II of FIG. 1.

A coupled structure of the lift arm 5 and the driven gear 3 will now be described using FIG. 1 and FIG. 2. FIG. 1 is a cross section of a portion of the invention according to one embodiment inversely showing a top-bottom relation of the lift arm and the driven gear in a cross section taken on the line I-I of FIG. 3. FIG. 2 is an enlarged view of a portion II of FIG. 1.

Referring to the drawings, the lift arm 5 (lower member) is provided with a tapered through-hole 35 having an inner wall surface 31 made larger in diameter toward a lower surface by plastic working (press working). By providing the tapered through-hole 35 by plastic working, the lift arm 5 is provided with a first inner wall portion 33 work-hardened due to plastic deformation along the inner wall surface 31 of the tapered through-hole 35.

Further, the lift arm 5 is provided with a swell portion 45 by plastic working on the lower surface along a rim of an opening on the lower surface side of the tapered through-hole 35. Referring to FIG. 2, a portion thicker than a plate thickness (t) of the lift arm 5 is the swell portion 45. The swell portion 45 is provided with an inner wall surface 41 continuing to the inner wall surface 31 of the tapered through-hole 35. Also, a second inner wall portion 43 work-hardened due to plastic deformation is provided within the swell portion 45 along the inner wall surface 41.

The driven gear 3 is provided with a protrusion 51 fit in from the tapered through-hole 35 to the swell portion 45. An outer wall surface 44 of the protrusion 51 is in close contact with the inner wall surface 31 of the tapered through-hole 35 and at least a part thereof is in close contact with the inner wall surface 41 of the swell portion 45. An outer wall portion 53 work-hardened due to plastic deformation is provided within the protrusion 51 along an outer wall surface 55.

The driven gear 3 is provided with a bottomed hole 61 in, an upper surface on the back side of the protrusion 51. The bottomed hole 61 has a sectional shape smaller than a sectional shape of the protrusion 51 and a bottom surface reaching a height of the tapered through-hole 35 of the lift arm 5. The driven gear 3 is also provided with a conical recess 63 in a lower end face of the protrusion 51.

An outer rim side of the swell potion 45 of the lift arm 5 is a slope face 45a. A ring-shaped line trace 65 is provided at a boundary between the slope face 45a and a plane of the lift arm 5.

The conical recess 63 of the driven gear is formed by a lower punch. The line trace 65 of the lift arm 5 is formed by a rim corner of an opening of a lower dice on which the lift arm 5 is mounted with the protrusion 51 and the swell portion 45 placed in the opening.

By providing the driven gear 3 with the bottomed hole 61 and the conical recess 63 and the lift arm 5 with the line trace 65 by an upper punch, the lower punch, and the lower dice, respectively, the protrusion 51 of the driven gear 3 that fits to the hole provided to the lift arm 5 is formed. Further, the outer wall portion 53 work-hardened due to plastic deformation is formed in the protrusion 51 along the outer wall surface 55. in particular, when the conical recess 63 is provided to the lower end face of the protrusion 51, flesh of the protrusion 51 moves and presses the inner wall 31 surface of the tapered through-hole 35 of the lift arm 5. Because the conical recess 63 is a recess made larger in opening area toward the lower part, an amount of the moved flesh of the protrusion 51 increases more toward the lower part. Hence, interference of the through-hole of the lift arm 5 increases more toward the lower surface and this hole becomes the tapered through-hole 35 provided with the first inner wall portion 33 work-hardened due to plastic deformation along the inner wall surface 31. Further, the swell portion 45 is formed along the rim of the opening on the lower surface side of the tapered through-hole 35. The swell portion 45 has interference that increases more toward the lower surface and the inner wall surface 41 continuing to the inner wall surface 31 of the tapered through-hole 35, and is provided with the second inner wall portion 43 work-hardened due to plastic deformation along the inner wall surface 41.

In this embodiment, a coupled structure of the cylinder portion 114 of the first arm portion 11 and the cylinder portion 124 of the second arm portion 12 of the equalizer arm 10 is same as the coupled structure of the lift arm 5 and the driven gear 3.

According to the configuration as above, the following advantages can be obtained.

(1) The outer wall surface 55 of the protrusion 51 of the driven gear 3 is in close contact with the inner wall surface 31 of the tapered through-hole 35 of the lift arm 5 that is made larger in diameter toward the lower surface. Accordingly, an area across which the outer wall surface 55 of the protrusion 51 of the driven gear 3 and the inner wall surface 31 of the tapered through-hole 35 are in close contact with each other becomes larger, and separation strength of the driven gear 3 and the lift arm 5 therefore becomes higher. Hence, even when the driven gear 3 and the lift arm 5 are subjected to a separation force, the driven gear 3 and the lift arm 5 do not separate from each other and the coupled structure does not break.

(2) The lift arm 5 is provided with the first inner wall portion 33 work-hardened due to plastic deformation along the inner wall surface 31 of the tapered through-hole 35 and the second inner wall portion 43 work-hardened due to plastic deformation along the inner wall surface 41 of the swell portion 45. Also, the protrusion 51 of the driven gear 3 that fits to the tapered through-hole 35 and the swell portion 45 of the lift arm 5 is provided with the outer wall portion 53 work-hardened due to plastic deformation along the outer wall surface 55. That is to say, shearing strength of the tapered through-hole 35 and the swell portion 45 of the lift arm 5 and shearing strength of the protrusion 51 of the driven gear 3 become higher. Hence, even when the driven gear 3 and the lift arm 5 are subjected to a large force that forces the driven gear 3 and the lift arm 5 to undergo relative movement in a radial direction of the tapered through-hole 35, a shear failure does not occur in any of the tapered through-hole 35 and the swell portion 45 of the lift arm 5 and the protrusion 51 of the driven gear 3. Hence, the coupled structure does not break.

Also, a coupled structure of the cylinder portion 114 of the first arm portion 11 and the cylinder portion 124 of the second arm portion 12 of the equalizer arm 10 is same as the coupled structure of the lift arm 5 and the driven gear 3. Hence, even when the first arm portion 11 and the second arm portion 12 are subjected to a separation force, the first arm portion 11 and the second arm portion 12 do not separate from each other and the coupled structure does not break. Further, even when the first arm portion 11 and the second arm portion 12 are subjected to a large force that forces the first arm portion 11 and the second arm portion 12 to undergo relative movement in a radial direction of the cylinder portions 114 and 124, the coupled structure does not break.

It should be appreciated that the invention is not limited to the embodiment above. The embodiment above has been described using an X-arm window regulator. However, the invention is also applicable to a coupled structure of a lift arm and a driven gear in a single-arm window regulator excluding the equalizer arm and including the lift arm alone.

Also, the invention is not limited to a coupled structure of the lift arm and the driven gear of the window regulator and the invention is also applicable to a coupled structure formed by coupling two plate materials.

DESCRIPTION OF REFERENCE NUMERALS AND SIGNS

3: driven gear (upper member)
5: lift arm (lower member)
31: inner wall surface
33: first inner wall portion
35: tapered through-hole
41: inner wall surface
43: second inner wall portion
45: swell portion
51: protrusion
53: outer wall portion
61: bottomed hole
63: conical recess
65: line trace

The invention claimed is:

1. A coupled structure formed by coupling a lower member and an upper member,
    wherein the lower member is provided with:
        a tapered through-hole having a sidewall that tapers away from a lower end of the tapered through-hole and which is provided with a first inner wall portion along an inner wall surface of the tapered through-hole; and
        a swell portion, which is provided on the lower end of the tapered through-hole and includes an inner wall surface continuing to the inner wall surface of the tapered through-hole, and which is provided with a second inner wall portion along the inner wall surface of the swell portion,
    wherein the upper member is provided with a protrusion, which includes an outer wall surface in close contact with both the inner wall surface of the tapered through-hole and at least a part of the inner wall surface of the swell portion to fit in the tapered through-hole and the swell portion and which includes an outer wall portion along the outer wall surface, and
    wherein the swell portion extends along the protrusion beyond a distal end of the outer wall surface.

2. The coupled structure according to claim 1, wherein the upper member is provided with a cavity on an upper surface side,
    wherein the cavity has a cross-sectional shape smaller than a cross-sectional shape of the protrusion as viewed from an axial direction of the cavity, and
    wherein a bottom surface of the cavity reaches a height of the tapered through-hole of the lower member.

3. The coupled structure according to claim 1, wherein the upper member is provided with a recess in a lower end face of the protrusion.

4. The coupled structure according to claim 1, wherein the lower member is provided with a punch-processed mark having a diameter larger than an opening of the tapered through-hole on the lower surface.

5. A window regulator having a drive source provided with a pinion on an output shaft, a lift arm disposed in a rotatable manner at an intermediate portion and coupled to a driven gear that meshes with the pinion at one rotation end, and a lift arm bracket attached to a window pane and provided with a guide extending in a direction that crosses an opening and closing direction of the window pane so as to engage with another rotation end of the lift arm by the guide, the window regulator being characterized in that:
    a coupled structure of the lift arm and the driven gear is the coupled structure set forth in claim 1.

6. The coupled structure according to claim 1, wherein an upper end of the inner wall surface of the swell portion is continuing to the lower end of the inner wall surface of the tapered through-hole.

7. The coupled structure according to claim 1, wherein the swell portion tapers toward a lower end of the swell portion.

8. The coupled structure according to claim 1, wherein the first inner wall portion is work-hardened due to plastic deformation,
    wherein the second inner wall portion is work-hardened due to the plastic deformation, and
    wherein the outer wall portion is work-hardened due to plastic deformation.

* * * * *